(12) United States Patent
Lenzi

(10) Patent No.: US 6,349,608 B1
(45) Date of Patent: Feb. 26, 2002

(54) TRANSMISSION GEAR SHIFT ROD CONTROL DEVICE

(75) Inventor: Gianluigi Lenzi, Bologna (IT)

(73) Assignee: Magneti Marelli S.p.A. (IT)

( * ) Notice: Subject to any disclaimer, the term of this patent is extended or adjusted under 35 U.S.C. 154(b) by 0 days.

(21) Appl. No.: 09/482,459

(22) Filed: Jan. 13, 2000

(30) Foreign Application Priority Data

Jan. 14, 1999 (IT) .......................................... BO99A0012

(51) Int. Cl.⁷ ........................... B60K 17/04; B60K 17/12
(52) U.S. Cl. ..................................... 74/473.12; 74/335
(58) Field of Search ............................... 74/335, 337.5, 74/473.12, 473.1, 471 R

(56) References Cited

U.S. PATENT DOCUMENTS

| | | | |
|---|---|---|---|
| 5,150,629 A | * 9/1992 | Morris et al. | 74/337.5 |
| 5,251,503 A | * 10/1993 | Morris et al. | 74/337.5 |
| 5,988,009 A | * 11/1999 | Tornatore et al. | 74/473.27 |

FOREIGN PATENT DOCUMENTS

| | | |
|---|---|---|
| EP | 0849508 | 6/1998 |
| JP | 58-191354 | * 11/1983 |
| JP | 63-87322 | * 4/1988 |
| JP | 5-118440 | * 5/1993 |

OTHER PUBLICATIONS

Document No. 00100672 in EPO Search Report.
Document No. 00100672.5 in EPO Abstract.

* cited by examiner

*Primary Examiner*—David Fenstermacher
(74) *Attorney, Agent, or Firm*—Hall, Priddy, Myers & Vande Sande

(57) ABSTRACT

A control device for controlling a gear shift rod, and having a control shaft connected to the gear shift rod; a linear actuator for effecting given axial displacements or given angular displacements of the control rod to shift between two gear engagement positions in the same range; a first cam guide device for converting, on command, the axial or angular displacements into combined axial-angular displacements, so as to shift between consecutive gears in consecutive ranges; and a second cam guide device for converting, on command, the axial or angular displacements into combined axial-angular displacements, so as to shift between nonconsecutive gears in not necessarily consecutive ranges.

12 Claims, 6 Drawing Sheets

TRANSMISSION GEAR SHIFT ROD CONTROL DEVICE

The present invention relates to a transmission gear shift rod control device.

In particular, the present invention relates to a device for controlling the gear shift rod of a mechanical H type transmission normally used on motor vehicles and similar, and to which the following description refers purely by way of example.

BACKGROUND OF THE INVENTION

As is known, currently used transmissions for motor vehicles and similar comprise a transmission casing from which projects at least one gear shift rod which is operated by the driver of the vehicle to select and engage a given gear.

In commonly used H transmissions, gear selection and engagement are effected by a combination of angular and axial displacements of the gear shift rod, from which the definition "mechanical H transmission" derives.

With reference to FIGS. 1a and 1b, the gear engagement positions are in fact arranged in a double H configuration, in which the gears are divided into pairs (e.g. 1–2, 3–4 and 5–R) commonly referred to as "ranges", so that, as of a reference position normally located at the center of the double H, gear engagement is effected by axial (FIG. 1a) or angular (FIG. 1b) displacement, and range selection by angular (FIG. 1a) or axial (FIG. 1b) displacement, of the gear shift rod.

Currently used gear shift rod control devices substantially comprise a control shaft connected to the transmission shift rod itself; and a pair of actuators connected to and for rotating and axially moving the control shaft.

More specifically, when range selection is effected by angular displacement of the gear shift rod. (FIG. 1a), the actuator governing angular displacement of the control shaft provides for three different angular control shaft positions (four in the case of a six-speed plus reverse transmission), each corresponding to a given range selection; while the linear actuator governing axial displacement of the control shaft provides for three different axial control shaft positions, each corresponding to engagement of a given gear or to the neutral position. Conversely, when range selection is effected by axial displacement of the gear shift rod (FIG. 1b), the linear actuator governing axial displacement of the control shaft provides for three different axial control shaft positions (four in the case of a six-speed plus reverse transmission), each corresponding to a given range selection; while the actuator governing angular displacement of the control shaft provides for three different angular control shaft positions, each corresponding to engagement of a given gear or to the neutral position.

The above actuators are normally operated pneumatically, hydraulically or electrically, and are controlled by an electronic central control unit.

In another embodiment of the control device, the range selection actuator is replaced by a cam guide device which, when commanded, provides for combined angular-axial displacement of the control shaft of the device, so as to shift between two consecutive gears in two consecutive ranges, as opposed to two gears in the same range.

The cam guide device normally comprises a cylindrical cam fitted in axially rotating manner to the control shaft; and a lock device which, when commanded, prevents rotation of the cylindrical cam about the control shaft. The lock device is controlled by the electronic central control unit, and the cylindrical cam has a groove engaged in sliding manner by a radial pin extending from the control shaft. The groove is so shaped as to produce—when the lock device is set to prevent rotation of the cylindrical cam about the control shaft—a combined angular-axial displacement of the control shaft to shift between two consecutive gears in two consecutive ranges.

Control devices with two linear actuators have the major drawback of requiring relatively complex component parts, such as multiposition actuators, valves, travel regulating members and position transducers, which call for accurate machining and involve high-cost construction arrangements. On the other hand, though much simpler in design, single linear actuator control devices provide for sequential shifting which, in certain operating conditions, is not particularly desired.

For example, when downshifting skipping one or more gears, single linear actuator control devices are forced to downshift through all the intervening gears, thus considerably increasing shift time and impairing the drivability of the vehicle. The same also applies to repeat shifting between first and reverse gear when parking, in which case the control device is again forced to shift continually through all the intervening gears.

SUMMARY OF THE INVENTION

It is an object of the present invention to provide a gear shift rod control device designed to combine the advantages of the two actuator solution with those of the single linear actuator, cam guide device solution.

According to the present invention, there is provided a control device for controlling the gear shift rod of a transmission, wherein the gear shift rod is movable, by virtue of axial displacements and/or rotations, between a number of gear engagement positions, each corresponding to engagement of a gear or to the neutral position; the control device comprising:

fixed supporting means;

a control shaft fitted to said fixed supporting means so as to rotate angularly about its own axis to effect a gear range selection, and move axially along its own axis to engage/disengage the gears; for each gear range, said control shaft also assuming three distinct axial positions corresponding respectively to an axial neutral position and two axial gear engagement positions;

actuating means for selectively moving said control shaft axially along its own axis between said three distinct axial positions; and first cam guide means connected mechanically to said control shaft, and which provide, during axial displacement of the control shaft to shift between the two axial gear engagement positions of one range, for selectively effecting a sufficient angular rotation of the control shaft to shift to the immediately following/preceding range, so as to effect a sequential gear engagement, i.e. shift between consecutive gears in consecutive ranges; the control device being characterized by comprising second cam guide means connected mechanically to said control shaft, and which provide, during axial displacement of the control shaft to shift between the two axial gear engagement positions of one range, for selectively effecting rotation of the control shaft in the opposite direction to that effected by the first cam guide means, so as to shift between nonconsecutive gears.

Alternatively, according to the present invention, there is provided a control device for controlling the gear shift rod of a transmission, wherein the gear shift rod is movable, by virtue of axial displacements and/or rotations, between a number of gear engagement positions, each corresponding to engagement of a gear or to the neutral position; the control device comprising:

fixed supporting means;

a control shaft fitted to said fixed supporting means so as to rotate angularly about its own axis to engage/disengage the gears, and move axially along its own axis to effect a gear range selection; for each gear range, said control shaft also assuming three distinct angular positions corresponding respectively to an angular neutral position and two angular gear engagement positions;

actuating means for selectively moving said control shaft angularly about its own axis between said three distinct angular positions; and first cam guide means connected mechanically to said control shaft, and which provide, during angular displacement of the control shaft to shift between the two angular gear engagement positions of one range, for selectively effecting a sufficient axial displacement of the control shaft to shift to the immediately following/preceding range, so as to effect a sequential gear engagement, i.e. shift between consecutive gears in consecutive ranges; said control device being characterized by comprising second cam guide means connected mechanically to said control shaft, and which provide, during angular displacement of the control shaft to shift between the two angular gear engagement positions of one range, for selectively effecting an axial displacement of the control shaft in the opposite direction to that effected by the first cam guide means, so as to shift between nonconsecutive gears.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1A:
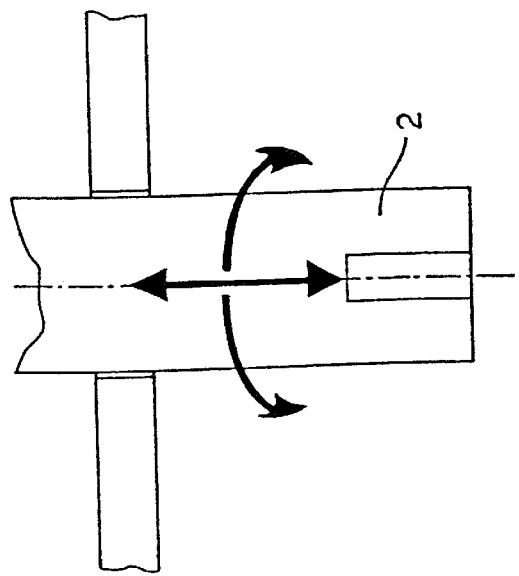
FIGS. 1a and 1b show, schematically, two possible gear engagement grids of an H transmission in relation to the gear shift rod of the transmission.
Figure 1A:
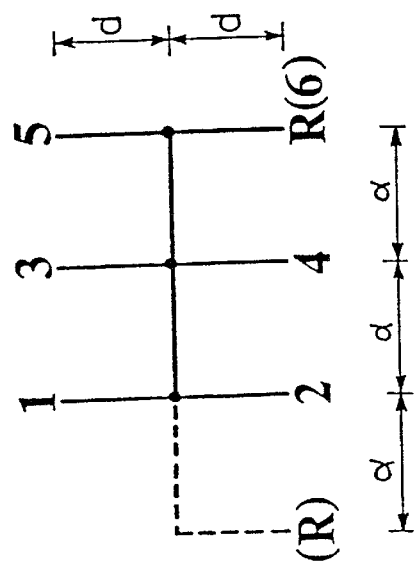
Figure 1B:
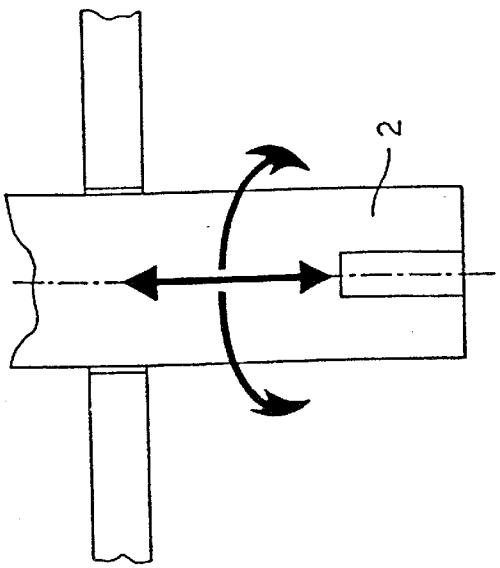
Figure 1B:
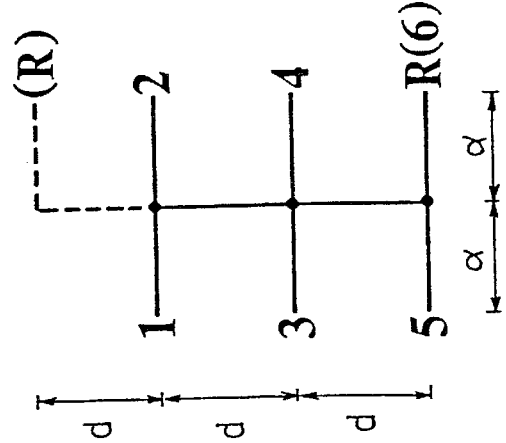
Figure 2:
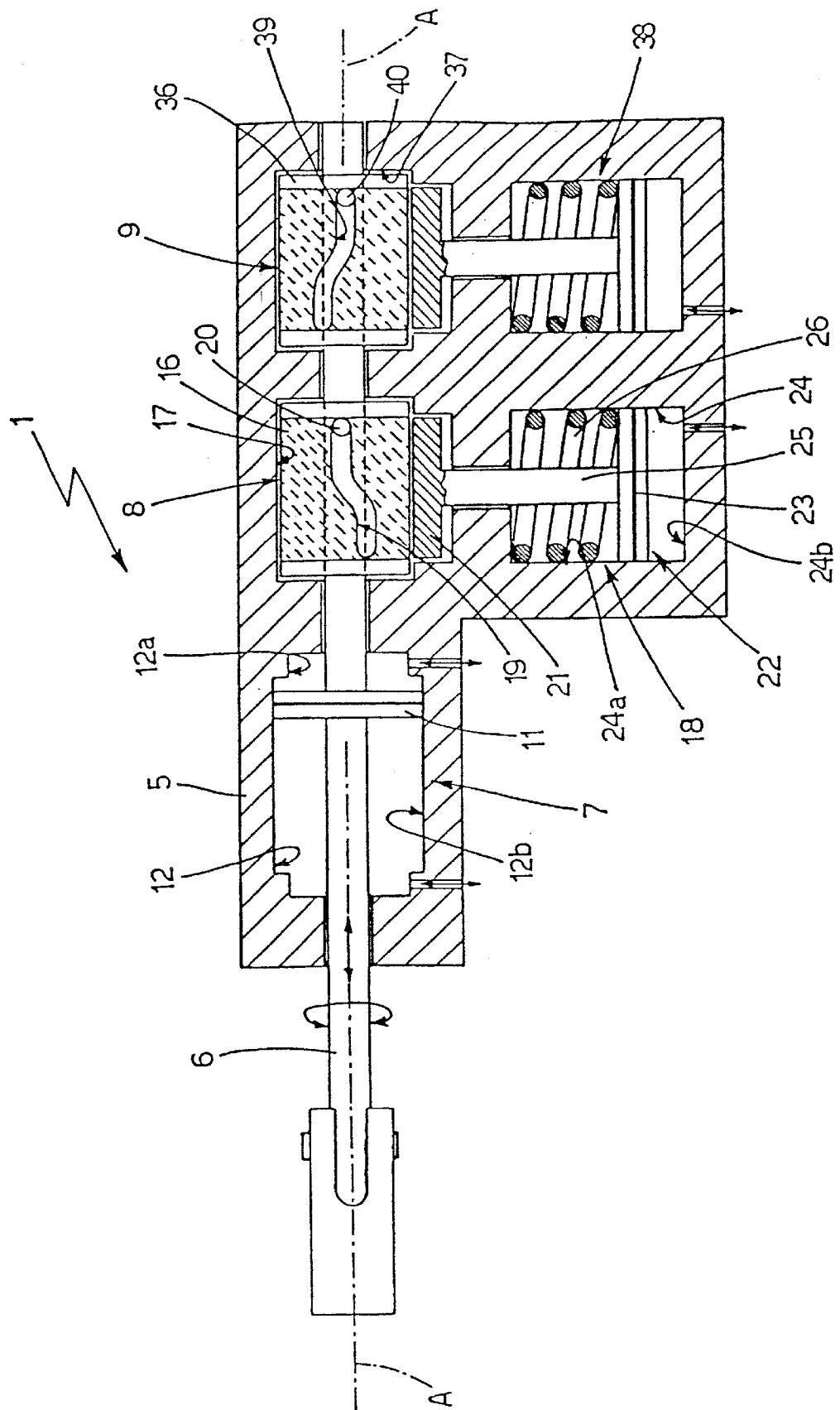
FIG. 2 shows a section, with parts removed for clarity, of a transmission shift rod control device in accordance with the teachings of the present invention.

With reference to FIGS. 1a, 1b and 2, number 1 indicates as a whole a device for controlling the gear shift rod 2 of a known mechanical transmission, preferably, but not necessarily, of the H selection grid type normally used on motor vehicles and similar.

In particular, control device 1 provides, on command, for effecting given axial and/or angular displacements of the gear shift rod 2 extending from the transmission casing, so as to shift, on command, from one gear to another. The gear shift rod 2 of a mechanical H transmission, in fact, is movable between a number of gear engagement positions arranged in a double H selection grid as shown in FIG. 1a or 1b.

It should be pointed out that a mechanical H transmission may also comprise two or more gear shift rods 2; in which case, though the selection grid may differ, shifting from one gear to another is nevertheless performed by effecting a given axial and/or angular displacement of at least one of the shift rods 2.

With reference to FIG. 2, control device 1 comprises an outer casing 5; a control shaft 6 mounted to rotate angularly and move axially inside casing 5; a linear actuator 7 for moving control shaft 6, on command, parallel to axis A of the control shaft; and a cam guide device 8 which, on command, provides for converting axial displacement of control shaft 6 into combined angular-axial displacement, so as to convert a shift between two gears in the same range into a shift between two consecutive gears in two consecutive ranges.

Control device 1 also comprises a second cam guide device 9 which, on command, provides for converting axial displacement of control shaft 6 into combined angular-axial displacement, so as to convert a shift between two consecutive gears in the same range into a shift between two nonconsecutive gears in two consecutive ranges.

Casing 5 houses linear actuator 7 and the two cam guide devices 8 and 9, and is fitted to the transmission so that control shaft 6 is aligned with gear shift rod 2. One end of control shaft 6, on the other hand, is connected to gear shift rod 2 so as to transmit said angular and axial displacements to rod 2. More specifically, in the example shown, the end of control shaft 6 comprises a known mechanical joint for connecting control shaft 6 rigidly to gear shift rod 2.

With reference to FIG. 2, linear actuator 7 may assume three different axial positions, each corresponding to engagement of a gear or to the neutral position, and, in the example shown, is defined by a piston 11 mounted to slide axially inside a cylindrical cavity 12 formed in casing 5. Cylindrical cavity 12 extends coaxially with axis A inside casing 5, and is fitted through with control shaft 6, while piston 11 is fitted to control shaft 6 and defines, inside cylindrical cavity 12, two complementary, variable-volume chambers 12a and 12b.

Chambers 12a and 12b are filled alternately or simultaneously with pressurized fluid to set control shaft 6, to which piston 11 is fitted rigidly, to one of said three different axial positions, each corresponding to engagement of a gear or to the neutral position. More specifically, and with reference to FIG. 1a, when the two chambers 12a and 12b are filled simultaneously, control shaft 6 is set to an intermediate position corresponding to selection of the neutral position; whereas, when chamber 12a or 12b is filled, control shaft 6 is moved forwards or backwards by a given amount d with respect to the intermediate position, so as to engage the bottom or top gear in the range.

Figure 4:
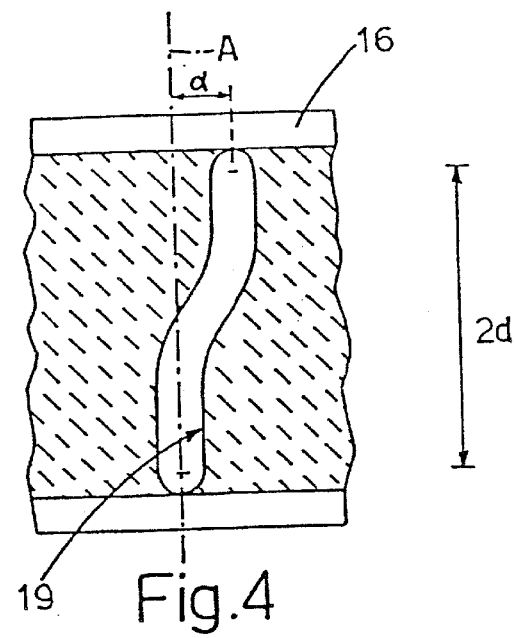
FIG. 4 shows a plan view of a first detail of the FIGS. 2 and 3 device.

With reference to FIG. 2, cam guide device 8 comprises a cylindrical shaft-guide cam 16 mounted for rotation about control shaft 6 inside a cylindrical seat 17 formed in casing 5; and a lock device 18 which, on command, prevents rotation of cylindrical cam 16 about axis A. A substantially S-shaped slot 19 (FIG. 4) is formed in the lateral wall of cylindrical cam 16, and is engaged in sliding manner by a pin 20 extending radially from control shaft 6, so as to produce a combined axial-angular displacement of control shaft 6 for sequential gear engagement.

More specifically, slot 19 (FIG. 4) is so shaped as to rotate control shaft 6, during axial displacement to shift from the top to the bottom gear in the range, by an amount equal to the angular displacement a required to shift to the adjacent range, and in such a direction as to shift to the immediately following range, so that what would have been a top to bottom gear shift within the same range is converted into a shift from the top gear in one range to the bottom gear in the immediately following range.

Obviously, if the axial displacement of control shaft 6 is to shift from the bottom to the top gear in the range, control shaft 6 is rotated in the opposite direction to convert what would have been a bottom to top gear shift within the same range into a shift from the bottom gear in one range to the top gear in the immediately preceding range.

It should be pointed out that control shaft 6 may only be rotated clockwise or anticlockwise when cylindrical cam 16 is prevented from rotating about axis A. Conversely, control shaft 6 is moved axially as cylindrical cam 16 rotates about axis A.

With reference to FIG. 1*a*, when cylindrical cam 16 is idle, in-range shifting is permitted between such gears as 1–2, 2–1, 3–4, 4–3, 5–R, R–5, 5–(6) or (6)–5; whereas, when cylindrical cam 16 is locked, shifting between consecutive gears in consecutive ranges is permitted between such gears as (R)–1, 1–(R), 2–3, 3–2, 4–5 or 5–4.

In the example shown, lock device 18 for locking cam guide device 8 is defined by a jaw 21 housed inside cylindrical seat 17 and facing the outer lateral surface of cylindrical cam 16; and by a pressure member 22 for moving jaw 21, on command, radially to and from a work position in which jaw 21 rests on cylindrical cam 16 to prevent rotation of control shaft 6 about axis A.

In the example shown, pressure member 22 is defined by a piston 23 mounted to slide axially inside a cylindrical cavity 24 extending radially, i.e. perpendicular to axis A, inside casing 5. Piston 23 defines, inside cylindrical cavity 24, two complementary, variable-volume chambers 24*a* and 24*b*, and is connected rigidly to jaw 21 by a rod 25 extending radially from the body of piston 23 and through the bottom of cylindrical cavity 24, and facing the inside of cylindrical seat 17 housing jaw 21.

Chamber 24*a*, interposed between piston 23 and jaw 21, houses a helical spring 26 for maximizing the volume of chamber 24*a*; while chamber 24*b* is filled with a pressurized fluid which, in opposition to the elastic force of helical spring 26, moves piston 23 radially to increase the volume of chamber 24*b*. The displacement of piston 23 required to increase the volume of chamber 24*b* results in radial displacement of jaw 21 onto the outer lateral surface of cylindrical cam 16, thus locking cylindrical cam 16.

Figure 5:
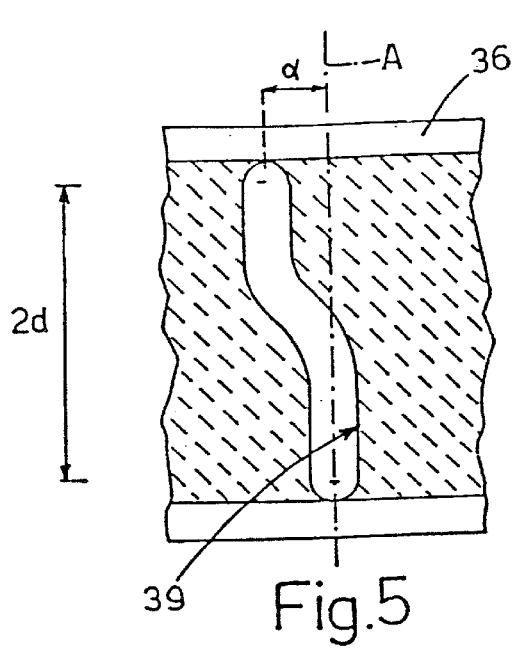
FIG. 5 shows a plan view of a second detail of the FIGS. 2 and 3 device.

With reference to FIG. 2, like cam guide device 8, cam guide device 9 comprises a cylindrical shaft-guide cam 36 mounted for rotation about control shaft 6 inside a cylindrical seat 37 formed in casing 5; and a lock device 38 which, on command, prevents rotation of cylindrical cam 36 about axis A. Like cylindrical cam 16 of cam guide device 8, cylindrical cam 36 also comprises a slot 39 engaged in sliding manner by a pin 40 extending radially from control shaft 6. Slot 39 (FIG. 5), however, is shaped specularly with respect to slot 19 so as to rotate control shaft 6, during the same axial displacement of control shaft 6, in the opposite direction to the rotation imparted by cylindrical cam 16.

As such, an in-range top to bottom gear shift is converted into a shift from the top gear of one range to the bottom gear of the immediately preceding range; while an in-range bottom to top gear shift is converted into a shift from the bottom gear of one range to the top gear of the immediately following range.

Lock device 38 is identical to lock device 18, and therefore requires no further explanation.

With reference to FIG. 1*a*, when cylindrical cam 36 is locked, shifting is permitted between nonconsecutive gears in consecutive ranges, such as 1–4, 4–1, 3–R, R–3, 3–(6) or (6)–3.

Figure 3:
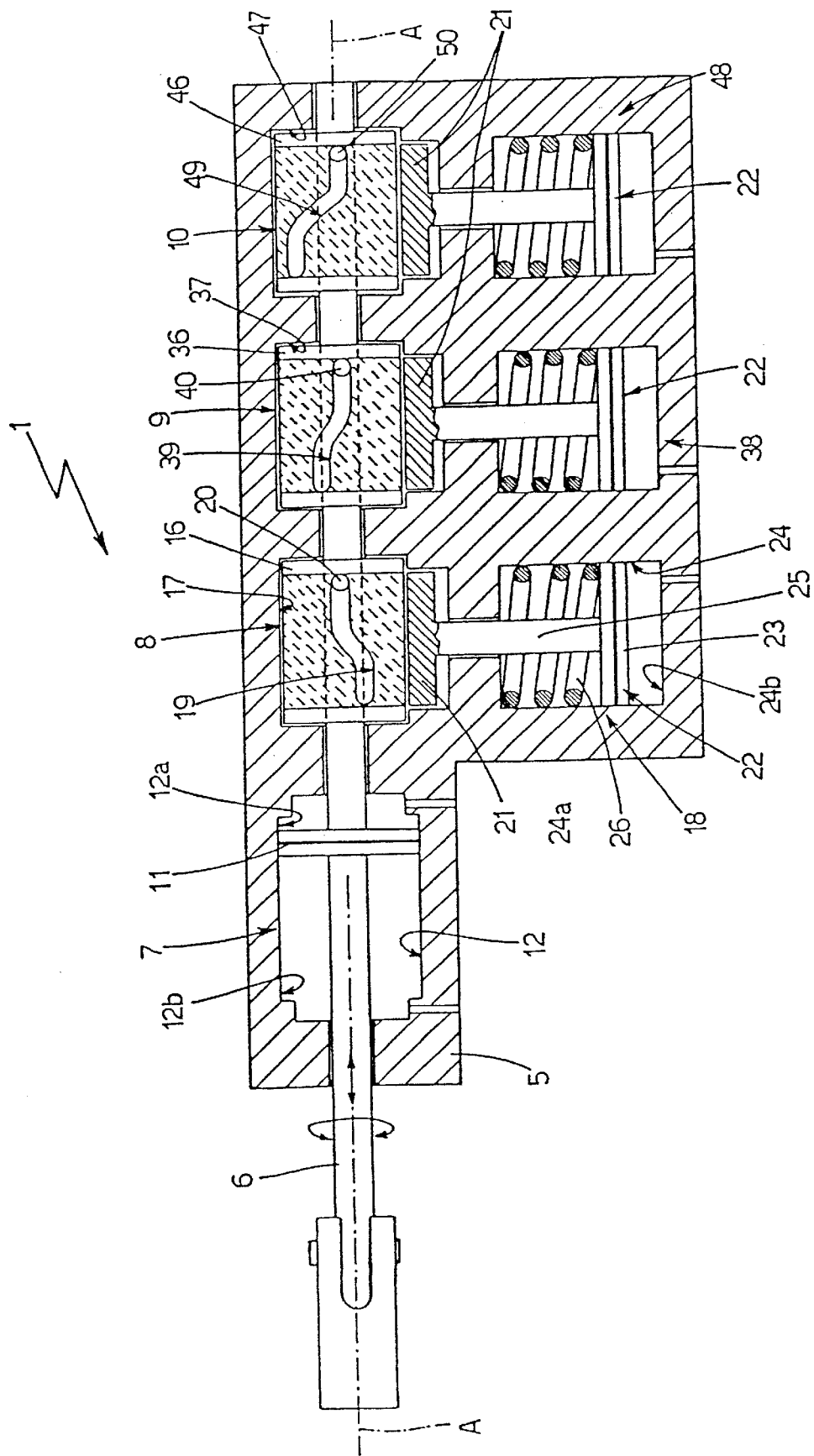
FIG. 3 shows a section, with parts removed for clarity, of a variation of the FIG. 2 control device.

In the FIG. 3 variation, control device 1 comprises a third cam guide device 10 which, on command, provides for converting axial displacement of control shaft 6 into combined angular-axial displacement, so as to convert a shift between two consecutive gears in the same range into a shift between two nonconsecutive gears in two nonconsecutive ranges.

With reference to FIG. 3, like cam guide devices 8 and 9, cam guide device 10 comprises a cylindrical shaft-guide cam 46 mounted for rotation about control shaft 6 inside a cylindrical seat 47 formed in casing 5; and a lock device 48 which, on command, prevents rotation of cylindrical cam 46 about axis A.

Figure 6:
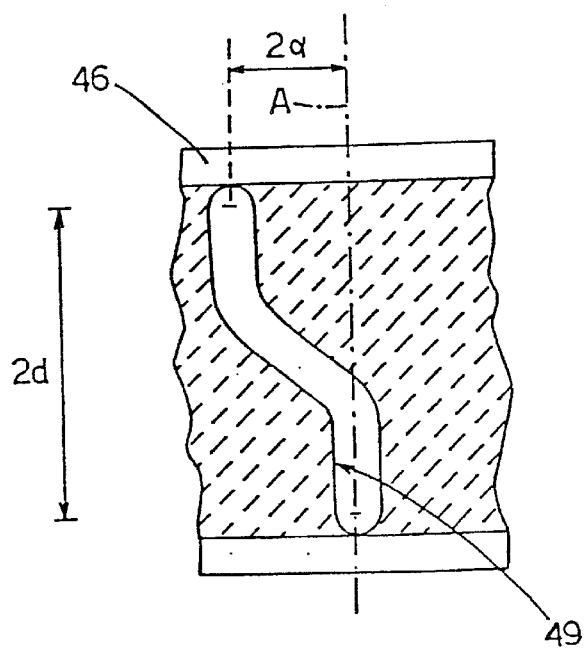
FIG. 6 shows a plan view of a detail of the FIG. 3 device.
Figure 7:
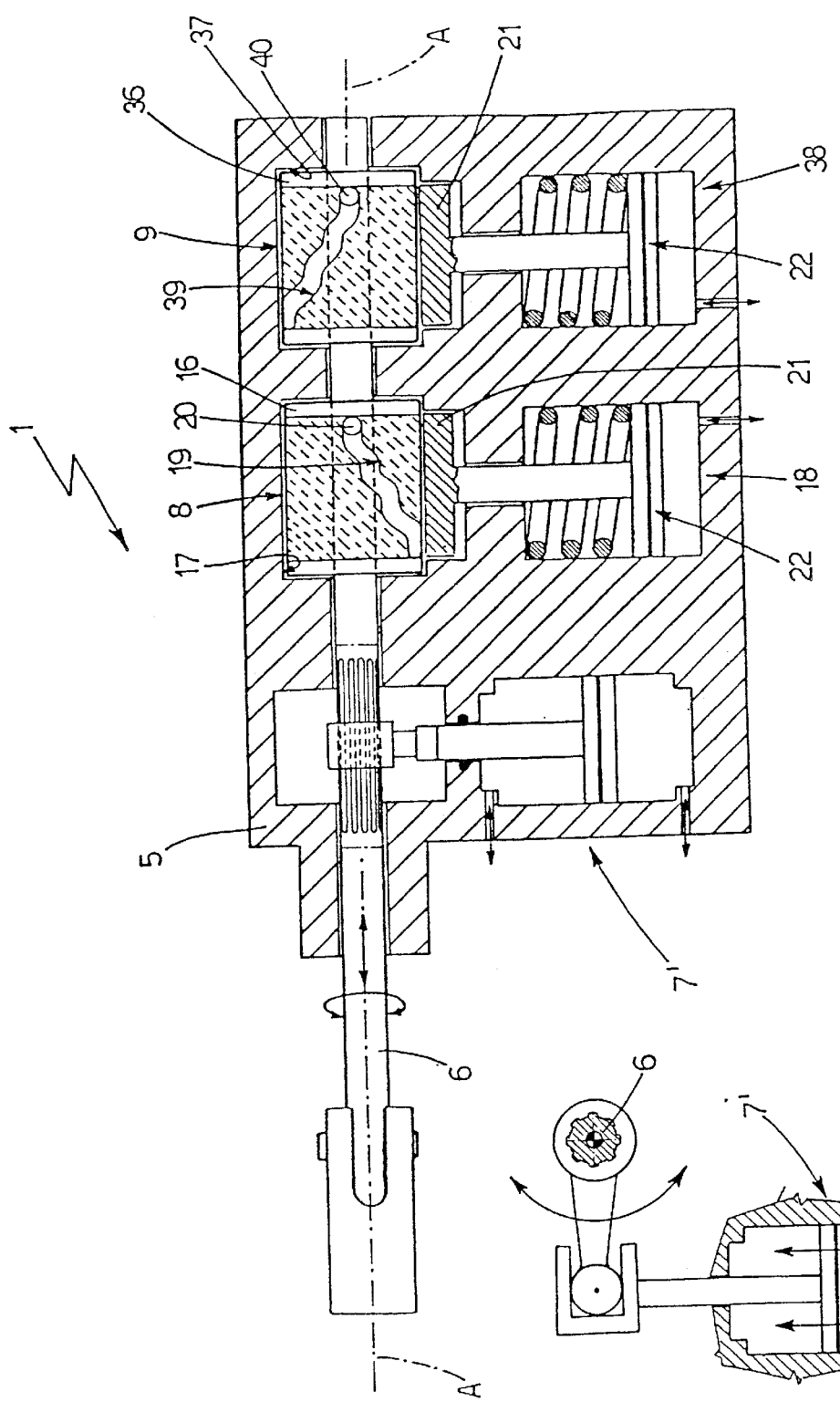
FIG. 7 shows a section, with parts removed for clarity, of a further preferred embodiment of the control device in the preceding Figures.

Like cylindrical cams 16 and 36 of cam guide devices 8 and 9, cylindrical cam 46 also comprises a slot 49 engaged in sliding manner by a pin 50 extending radially from control shaft 6. Slot 49 (FIG. 6), however, is so shaped as to rotate control shaft 6, during axial displacement of control shaft 6, by an angle 2*a* equal to the angular displacement required to shift between two nonadjacent ranges. The direction of rotation is obviously opposite that imparted to control shaft 6 by cylindrical cam 16.

With reference to FIG. 1*a*, when cylindrical cam 46 is locked, shifting is therefore permitted between nonconsecutive gears in nonconsecutive ranges, i.e. direct shifting is permitted from first gear to reverse and vice versa.

Lock device 48 is identical to lock device 18, and therefore requires no further explanation.

The above description relates to a control device 1 connected to a gear shift rod 2 whereby gear engagement is effected by axial displacements, and range selection by angular displacements, of the control shaft, as shown in FIG. 1*a*.

FIGS. 7, 8, 9 and 10, on the other hand, show an alternative embodiment of control device 1 connected to a gear shift rod 2 whereby gear engagement is effected by angular displacements, and range selection by axial displacements, of the control shaft, as shown in FIG. 1*b*.

Figure 10:
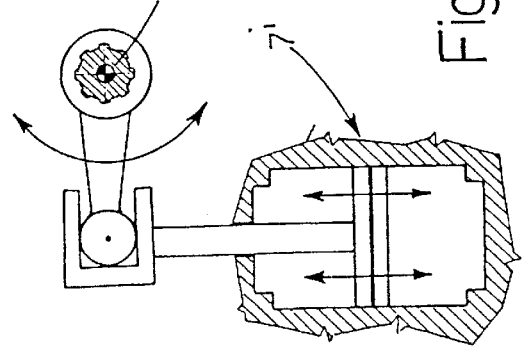
FIG. 10 shows a front view, with parts in section and parts removed for clarity, of the FIG. 7 control device.
Figure 8:
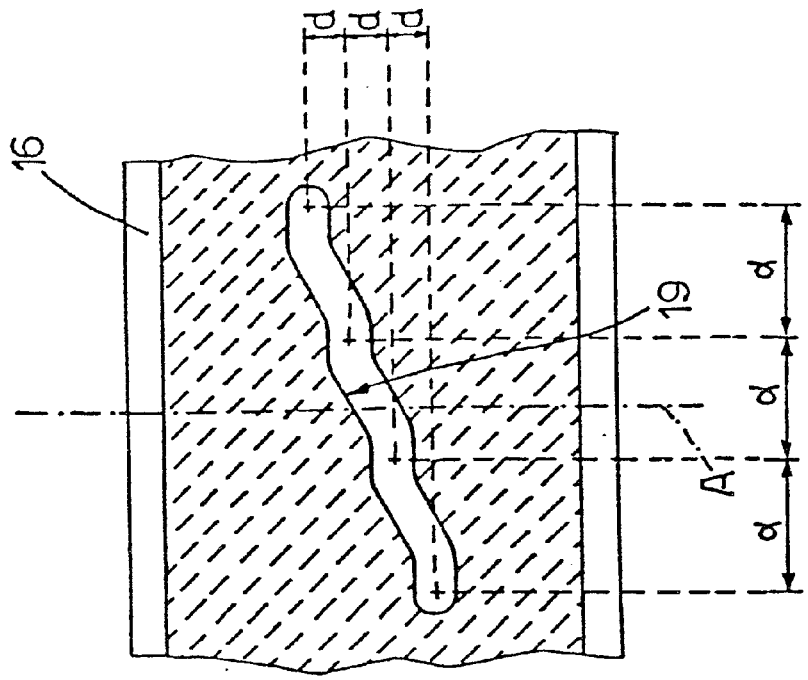
FIG. 8 shows a plan view of a first detail of the FIG. 7 device.
Figure 9:
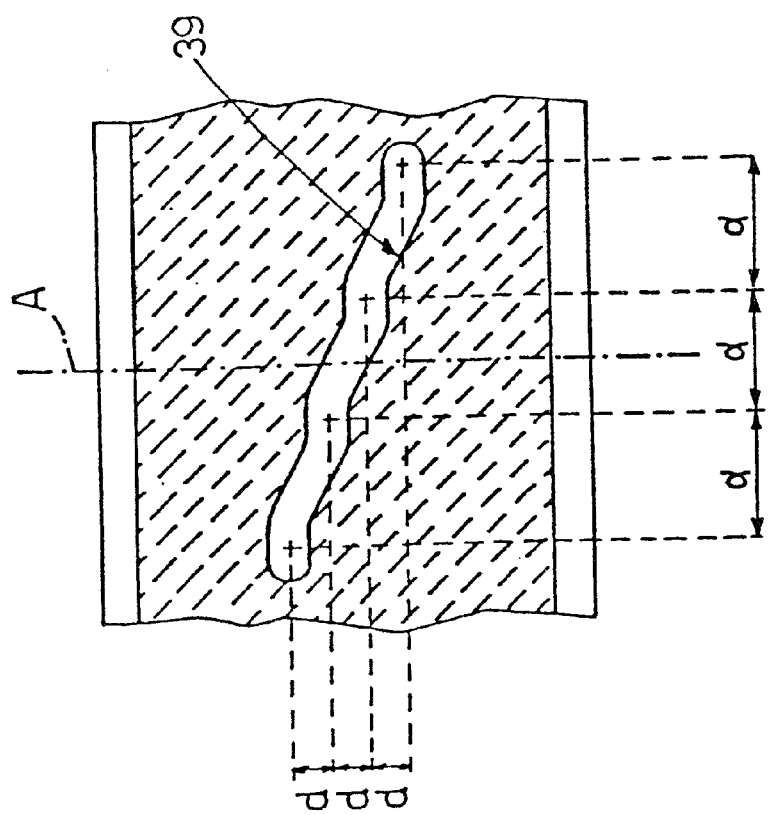
FIG. 9 shows a plan view of a second detail of the FIG. 7 device.

In this case, linear actuator 7 is replaced by a linear actuator 7' crosswise to control shaft 6 and connected to control shaft 6 by a known mechanism to move control shaft 6 between three different angular positions, each corresponding to engagement of a gear or to the neutral position. With reference to FIG. 10, in the particular example shown, said mechanism is defined by a connecting rod having a first end hinged to the output shaft of linear actuator 7', and a second end fitted angularly integral with and in axially sliding manner to control shaft 6.

This embodiment again comprises cam guide devices 8, 9, and possibly also 10, but slot 19 of cylindrical cam 16 is stepped (FIG. 8) to permit sequential gear engagement; slot 39 (FIG. 9) of cylindrical cam 36 is specular with respect to slot 19 to permit shifting between two nonconsecutive gears in two consecutive ranges; and slot 49 of cylindrical cam 46 is so formed as to permit shifting between nonconsecutive gears in nonconsecutive ranges, and so permit direct shifting from first gear to reverse and vice versa.

More specifically, during angular displacement to effect an in-range top to bottom gear shift, cam guide device 8 imparts to control shaft 6 an axial displacement of value d sufficient to shift to the adjacent range and, obviously, of such a direction as to shift to the immediately following range.

The axial displacements imparted to control shaft 6 by cam guide devices 9 and 10 are opposite in direction to that imparted by cam guide device 8 during the same angular displacement.

It should be pointed out that, in this embodiment, control shaft 6 comprises known click-on connecting means (not shown) for connecting cylindrical cams 16, 36, and 46 if present, angularly integral with control shaft 6 as long as the cams are idle and permitted to rotate about control shaft 6.

In the example shown, control shaft 6 has a number of radial seats fitted inside in axially rolling manner with a number of lock balls which are pushed outwards of the shaft by helical springs housed inside the radial seats. The lock balls are inserted partially inside hemispherical seats appropriately arranged on the inner lateral surfaces of cylindrical cams 16, 36 or 46 so as to connect cylindrical cams 16, 36 or 46 to control shaft 6 until the cams are made integral with the body of casing 5 by lock devices 18, 38 and 48.

Linear actuators 7 and 7' and pressure members 22 of lock devices 18, 38 and 48, which are hydraulic in the example shown, may of course be replaced by similar pneumatic or electric components.

Furthermore, control device 1 may obviously be integrated inside the transmission casing, so that casing 5 forms part of the transmission casing, and control shaft 6 forms part of gear shift rod 2.

In the above description, reference is made to a double H selection grid wherein the selection ranges are equidistant (equal-range selection grid), but control device 1 may of course be easily altered to operate with a double H selection grid wherein the selection ranges are not equidistant (unequal-range selection grid). Operation of control device 1 is self-explanatory from the foregoing description.

The advantages of the device according to the present invention are obvious: using only one linear actuator and a number of cam guide devices 8, 9 and 10, sequential gear engagement or direct shifting between nonconsecutive gears may be effected indifferently, thus-greatly improving the drivability of the vehicle.

Clearly, changes may be made to control device 1 as described and illustrated herein without, however, departing from the scope of the present invention.

What is claimed is:

1. A control device (1) for controlling the gear shift rod (2) of a transmission, wherein the gear shift rod (2) is movable, by virtue of axial displacements and/or rotations, between a number of gear engagement positions, each corresponding to engagement of a gear or to the neutral position; the control device (1) comprising:

fixed supporting means (5);

a control shaft (6) fitted to said fixed supporting means (5) so as to rotate angularly about its own axis (A) to effect a gear range selection, and move axially along its own axis (A) to engage/disengage the gears; for each gear range, said control shaft (6) also assuming three distinct axial positions corresponding respectively to an axial neutral position and two axial gear engagement positions;

actuating means (7) for selectively moving said control shaft (6) axially along its own axis (A) between said three distinct axial positions; and first cam guide means (8) connected mechanically to said control shaft (6), and which provide, during axial displacement of the control shaft (6) to shift between the two axial gear engagement positions of one range, for selectively effecting a sufficient angular rotation of the control shaft (6) to shift to the immediately following/preceding range, so as to effect a sequential gear engagement, between consecutive gears in consecutive ranges;

the control device (1) being characterized by comprising second cam guide means (9, 10) connected mechanically to said control shaft (6), and which provide, during axial displacement of the control shaft (6) to shift between the two axial gear engagement positions of one range, for selectively effecting an angular rotation of the control shaft (6) in the opposite direction to that effected by the first cam guide means (8), so as to shift between nonconsecutive gears.

2. A control device as claimed in claim 1, characterized in that the angular rotation imparted by said second cam guide means (9) is sufficient to shift to the immediately preceding/following range, so as to shift between nonconsecutive gears in consecutive ranges.

3. A control device as claimed in claim 2, characterized in that the angular rotation imparted by said third cam guide means (10) is sufficient to shift to an other than immediately preceding/following range, so as to shift between nonconsecutive gears in nonconsecutive ranges.

4. A control device as claimed in claim 2, characterized in that said second cam guide means (9, 10) comprise a cylindrical shaft-guide cam (36, 46) fitted in angularly rotating manner to the control shaft (6) inside said fixed supporting means (5); and locking means (38, 48) for selectively making said cylindrical cam (36, 46) integral with said fixed supporting means (5); said cylindrical cam (36, 46) having at least one shaped slot (39, 49) engaged in sliding manner by a pin (40, 50) extending radially from the control shaft (6).

5. A control device as claimed in claim 1, characterized by comprising third cam guide means (9, 10) connected mechanically to said control shaft (6) and which provide, during axial displacement of the control shaft (6) to shift between the two axial gear engagement positions in one range, for selectively effecting an angular rotation of the control shaft (6) in the opposite direction to that effected by the first cam guide means (8), so as to shift between nonconsecutive gears.

6. A control device as claimed in claim 1, characterized in that the angular rotation imparted by said second cam guide means (10) is sufficient to shift to an other than immediately preceding/following range, so as to shift between nonconsecutive gears in nonconsecutive ranges.

7. A control device (1) for controlling the gear shift rod (2) of a transmission, wherein the gear shift rod (2) is movable, by virtue of axial displacements and/or rotations, between a number of gear engagement positions, each corresponding to engagement of a gear or to the neutral position; the control device (1) comprising:

fixed supporting means (5);

a control shaft (6) fitted to said fixed supporting means (5) so as to rotate angularly about its own axis (A) to engage/disengage the gears, and move axially along its own axis (A) to effect a gear range selection; for each gear range, said control shaft (6) also assuming three distinct angular positions corresponding respectively to an angular neutral position and two angular gear engagement positions;

actuating means (7') for selectively moving said control shaft (6) angularly about its own axis (A) between said three distinct angular positions; and first cam guide means (8) connected mechanically to said control shaft (6), and which provide, during angular displacement of the control shaft (6) to shift between the two angular gear engagement positions of one range, for selectively effecting a sufficient axial displacement of the control shaft (6) to shift to the immediately following/preceding range, so as to effect a sequential gear engagement, between consecutive gears in consecutive ranges;

said control device (1) being characterized by comprising second cam guide means (9, 10) connected mechanically to said control shaft (6), and which provide, during angular displacement of the control shaft (6) to shift between the two angular gear engagement positions of one range, for selectively effecting an axial displacement of the control shaft (6) in the opposite direction to that effected by the first cam guide means (8), so as to shift between nonconsecutive gears.

8. A control device as claimed in claim 7, characterized in that the axial displacement imparted by said second cam guide means (9) is sufficient to shift to the immediately preceding/following range, so as to shift between nonconsecutive gears in consecutive ranges.

9. A control device as claimed in claim 8, characterized in that the axial displacement imparted by said third cam guide means (10) is sufficient to shift to an other than immediately preceding/following range, so as to shift between nonconsecutive gears in nonconsecutive ranges.

10. A control device as claimed in claim 8, characterized in that said second cam guide means (9, 10) comprise a cylindrical shaft-guide cam (36, 46) fitted in angularly rotating manner to the control shaft (6) inside said fixed supporting means (5); and locking means (38, 48) for selectively making said cylindrical cam (36, 46) integral with said fixed supporting means (5); said cylindrical cam (36, 46) having at least one shaped slot (39, 49) engaged in sliding manner by a pin (40, 50) extending radially from the control shaft (6).

11. A control device as claimed in claim 7, characterized by comprising third cam guide means (9, 10) connected mechanically to said control shaft (6) and which provide, during angular displacement of the control shaft (6) to shift between the two angular gear engagement positions in one range, for selectively effecting an axial displacement of the control shaft (6) in the opposite direction to that effected by the first cam guide means (8), so as to shift between nonconsecutive gears.

12. A control device as claimed in claim 7, characterized in that the axial displacement imparted by said second cam guide means (10) is sufficient to shift to an other than immediately preceding/following range, so as to shift between nonconsecutive gears in nonconsecutive ranges.

* * * * *